H. L. E. KRUEGER.
MEASURING INSTRUMENT.
APPLICATION FILED SEPT. 29, 1908.
931,774.
Patented Aug. 24, 1909.
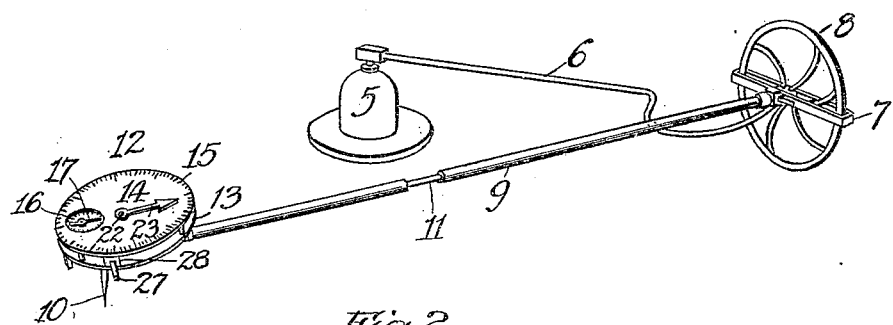
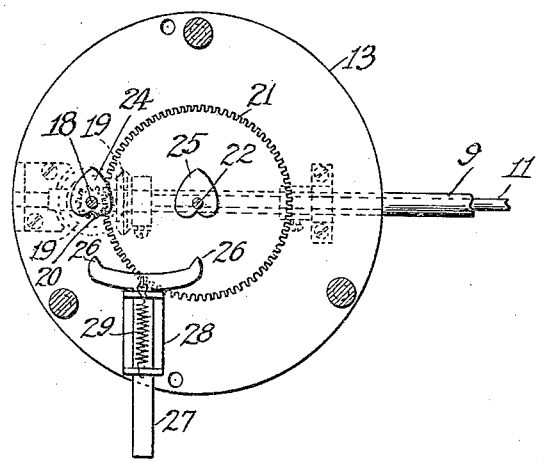
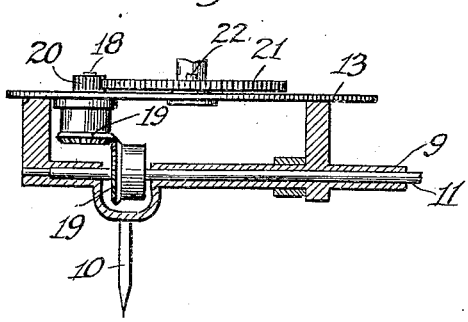
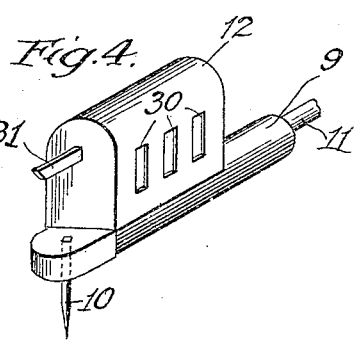

UNITED STATES PATENT OFFICE.

HENRY L. E. KRUEGER, OF CHICAGO, ILLINOIS, ASSIGNOR TO TUFTING MACHINE SUPPLY COMPANY, OF CHICAGO, ILLINOIS, A CORPORATION OF ILLINOIS.

MEASURING INSTRUMENT.

931,774.     Specification of Letters Patent.     Patented Aug. 24, 1909.

Application filed September 29, 1908. Serial No. 455,308.

*To all whom it may concern:*

Be it known that I, HENRY L. E. KRUEGER, a citizen of the United States, residing at Chicago, in the county of Cook and State of Illinois, have invented certain new and useful Improvements in Measuring Instruments, of which the following is a specification, reference being had therein to the accompanying drawing.

My invention relates to measuring instruments, and is particularly concerned with certain improvements in devices for measuring and indicating the superficial areas of hides, skins and other surfaces.

My invention is illustrated in the accompanying drawings, in which:—

Figure 1 is a perspective view of an apparatus embodying my present invention; Fig. 2 is a top plan view of the indicator shown in Fig. 1 with the top plate or dial removed and its posts in section; Fig. 3 is a view partly in section and partly in elevation of parts shown in Fig. 3; and Fig. 4 is a perspective view of a modified form of indicator which may be employed.

Referring to the accompanying drawings the reference numeral 5 indicates an anchor which may be of any suitable form to provide a fixed center of motion and which in the present instance is shown as a weight. An arm 6 is pivotally connected at one end to the weight and at its free end is provided with a frame 7 carrying a wheel 8 adapted to roll upon the surface of the hide or upon a circular disk arranged thereon. The frame 7 is pivotally connected to the free end of the arm 6, and rod 9 is rigidly attached at one end to the frame and at its other end carries a tracer 10. The hollow rod or arm 9 is arranged coaxially with the wheel 8, and the axle 11 of the wheel is journaled at one end in the frame 7 and extends within the hollow rod to a point at or near its free end, where it is arranged to actuate an indicator or counting mechanism 12 reading to square feet and fractions thereof up to approximately one hundred square feet. The indicator may be of any suitable type or form, as indicated in Figs. 1 and 4 for example, where different forms are illustrated; it is obvious that any specific form of such counting mechanism may be employed and therefore it is to be understood that I do not limit myself in any particular in this regard. Preferably I employ a counting mechanism which can be reset to zero at any point or at any reading, and this is shown in the two forms illustrated, each of which is provided with a resetting key or lever.

In the form of indicator shown in Fig. 1 a base 13 is mounted on the rod 9, and rigidly carries a dial 14 graduated at 15 into divisions showing square feet and at 16 into subdivisions showing square inches. The pointer 17 for the subdivisions 16 is mounted on a shaft 18 journaled in the base and dial, and is actuated by the axle 11 by means of bevel gears 19. The shaft 18 is provided with a small pinion 20 meshing with a larger pinion 21 on the shaft 22 of the pointer 23 for the divisions 15, the shaft 22 being also journaled in the base and dial. The wheel 8 and gears and pinions are so related that as the wheel 8 rotates by rolling upon the surface of the hide or circular disk (not shown), it will cause the pointers to indicate the number of square feet and fractions thereof within the surface or area traced by the tracer 10. The shafts 18 and 23 are provided with heart cams 24 and 25 respectively, which are in the same plane and are reset by the forked ends 26 of a resetting key 27 which is slidably mounted in a bracket 28 on the base and is held in retracted position out of the path of rotation of the cams by a spring 29. The cams are set so that their depressions are engaged by the forks when the pointers are at zero, thus providing for the stopping of the pointers at zero when they are reset. As heretofore stated any other suitable form of indicator may be used; for example, as shown in Fig. 4, the indicator may be of the type having a series of revolving dials showing at openings or windows 30, and reset by a key 31.

In the use of the device the anchor or fixed point 5 is placed within or upon the surface or the area to be measured, preferably being placed upon the surface of the leather or skin, and the tracer 10 at the free end of the rod 9 is then made to follow the edge or outline of the surface or area, such as the edge of the hide, throughout its contour, thus causing the wheel 8 to rotate to turn its axle and thereby actuate the counting mechanism or indicator. The tracer follows the outline of the area to be measured, and upon reaching the starting point the indicator will show the number of square feet and fractions of square feet contained within the area, the total being indicated directly at the point where the operator manipulates the instrument, and the indicator then being readily reset to zero by the operator simply pressing upon the resetting key.

By this construction the indicator is located directly at the point where the operator manipulates the instrument, and for the purpose of measuring a second area or surface the operator merely resets the indicator by the resetting key without the necessity of manipulating the wheel 8 or the counting mechanism itself, and for determining at any time the amount registered the operator has the indicator at all times immediately at or near his place of operation or station so that it is not necessary for him to interrupt his work and move to another point to ascertain the registration.

Having described my invention what I claim is:—

1. In a device of the class described, an anchor, an arm pivoted thereto, a rod pivotally connected to the free end of the arm, a wheel rotatably mounted at the end of the rod adjacent the arm, a tracer at the free end of the rod, an indicator mounted on the free end of the rod at the tracer, and connections passing through the rod between the indicator and wheel.

2. In a device of the class described, an anchor, an arm pivoted thereto, a hollow rod pivotally connected to the free end of the arm, an axle rotatably mounted in the rod, a wheel on the end of the axle adjacent the arm, a tracer at the free end of the rod, and an indicator mounted on the free end of the rod and operated by the axle of the wheel.

3. In a device of the class described, an anchor, an arm pivoted thereto, a frame pivotally connected to the free end of the arm, a hollow rod rigidly connected to the frame, an axle rotatably mounted in the rod, a wheel on the end of the axle at the frame, a tracer at the free end of the rod, and an indicator mounted on the free end of the rod and operated by the axle of the wheel.

4. In a device of the class described, an anchor, an arm pivoted thereto, a hollow rod pivotally connected to the free end of the arm, an axle rotatably mounted on the rod, a wheel on the end of the axle adjacent the arm, a tracer at the free end of the rod, and a resettable indicator mounted on the free end of the rod and operated by the axle of the wheel.

In testimony whereof I affix my signature in presence of two witnesses.

HENRY L. E. KRUEGER.

Witnesses:
J. McROBERTS,
GEORGE R. HARBAUGH.